Patented Oct. 27, 1953

2,657,145

UNITED STATES PATENT OFFICE 2,657,145

METHOD OF FORMING A CORROSION RESISTANT PAINT AND PRODUCT RESULTING THEREFROM

Arthur Arent, Fort Dodge, Iowa, assignor to Arthur Arent Laboratories Inc., Des Moines, Iowa, a corporation of Iowa No Drawing. Application September 23, 1950, Serial No. 186,499

5 Claims. (Cl. 106—14)

This invention relates to paints and has for its object the provision of an improved corrosion resistant paint and a method of producing the paint. More particularly, my invention is concerned with a paint comprising the oily reaction product of turpentine and anhydrous antimony trichloride, and the antimony compound in dispersion therein, being formed by reaction with water after the reaction of the turpentine and the antimony trichloride. While the paint provides an effective protection for metals generally, it is especially effective for the protection of iron and steel from atmospheric corrosion caused by fumes, gases, moisture, salt, and the like.

It is necessary for the purpose of carrying out the method of my invention to use the anhydrous antimony trichloride which is insoluble in water but which on contact with water changes to the water-insoluble antimony oxychloride. The so-called butter of antimony, also called antimony trichloride, contains a relatively large percentage of hydrochloric acid and is water soluble. It is not suitable for the purposes of my invention.

I have made the surprising discovery that by suitably proportioning and intermixing the turpentine (usually containing 80% to 95% pinene) and anhydrous antimony trichloride ($SbCl_3$) a vigorous reaction results with the liberation of fumes of various colors and the formation of an oily vehicle which is apparently a polymerization or condensation product of the pinene. I have found that approximately equal weights of anhydrous $SbCl_3$ and turpentine give the most desirable results, causing the reaction to proceed vigorously and to substantial completion. While a smaller percentage of $SbCl_3$ may be used providing it exceeds 30% by weight of the mixture, the results are not as effective as to the yield and character of the product. At the conclusion of the reaction, the antimony, whether in some form of new combination or as the trichloride, is intimately dispersed throughout the oily product. The product of the reaction is mixed with water to convert the antimony, in whatever form it may be, to a water-insoluble antimony compound, presumably $SbOCl_3$, which is an important part of my paint. The antimony compound after the water treatment appears to be a stabilized dispersion in the pinene end-product. One of the characteristic features of the paint of my invention is the stability of the dispersion of the antimony compound in the oily vehicle. The antimony compound does not settle to any appreciable extent and acts as a sort of colloidal dispersion. This freedom from settling and the character of the dispersion coupled with the physical properties of the oily product and antimony compound result in a very desirable paint for metals and other surfaces.

I may incorporate in the paint any suitable thinner such as turpentine, or dryers, or the common pigments such as red lead or aluminum.

In carrying out a preferred operation of the invention, approximately equal weights of turpentine and anhydrous $SbCl_3$ are placed in any suitable reaction vessel and stirred until the reaction commences which is usually spontaneous. The initiation of the reaction may be facilitated by the incorporation of a small amount of iron oxide in the materials. Once the reaction starts it proceeds with considerable violence until it has run its course. When substantial quantities in about equal proportions are reacted simultaneously, the reaction is accompanied by such an increase in the temperature that there is evolved a cloud of various colored fumes. After the violent reaction has subsided it is advantageous to stir the product at frequent intervals, say, every four hours, and to allow the product to remain for around twenty-four hours to complete the reaction. The product is mixed with water to convert any $SbCl_3$ present as well as any other compound of antimony to another form, probably to $SbOCl_3$. After the reaction, the antimony is in a highly dispersed state and after the water reaction it remains dispersed but seems to have more of the properties of colloids as manifested by the size of the particles and their remaining in suspension. There is a precipitation of a small proportion of an antimony compound which is not objectionable since it remains as a pigment of my paint. This, however, does not involve any substantial part of the total amount of antimony. I prefer to add approximately a 10% solution of ammonia to the paint to neutralize any free acid and then subject the product to a water wash to remove water-soluble impurities. The paint is separated from the water and is ready for application to the metallic surface to be protected.

The following examples are illustrative of a method and product of my invention:

Example I 454 grams of anhydrous antimony trichloride was added in divided amounts to 454 grams of turpentine and 50 grams of iron oxide with continuous stirring. The maximum temperature reached was 135° C. The product was washed with water and ammonia water. In order to separate the oily product, the product was treated with ethyl ether and filtered. The residue of antimony oxychloride and iron oxide was washed several times with ether to complete the removal of organic matter as indicated by an ignition test on the residue. The ether solution was dried and then freed of ether by distillation. A brown viscous oil remained. The brown viscous oil proved undistillable up to 260° C. at atmospheric pressure. The yield was approximately 90%.

The oil showed the following constants:

| | |
|---|---|
| Refractive Index, $N_D^{25}$ | 1.5902 |
| Density 25/4° C | 0.977 |
| Iodine value, Hanus | 53.4 |
| Diene number | 2.1 |
| Antimony in oil, nil. | |

*Example II*

In this example, 50 grams each of turpentine and anhydrous antimony trichloride were mixed together and after a few minutes a vigorous reaction ensued, a red color developed, the temperature rose to 190° C. with boiling of the mixture. The oily product resulting was similar to that of the first example.

In order to facilitate the drying of the paint, any suitable catalytic paint dryer may be used. For example, a dryer consisting of 0.5% lead, 0.05% manganese, and 0.05% cobalt will cause the paint to dry overnight to a hard nontacky brittle film. However, since a brittle film is not desirable for most purposes, especially to protect metals, a tough film may be secured by the use of a smaller amount of dryer.

The improved corrosion resistant paint of my invention has the capacity to retard the rusting of iron or steel under hot and humid atmospheric conditions, including the salt conditions such as prevail in tropical areas, for comparatively long periods. I believe the effective protection of metallic surfaces by my paint are due to the tough adherent and impervious character of the oily vehicle coupled with the corrosion inhibiting properties of the antimony contained in and effectively dispersed throughout the vehicle.

I claim:

1. The method of forming an improved corrosion-resistant paint which comprises mixing turpentine and anhydrous antimony chloride, with the amount of antimony chloride being from 30% to about 50% by weight of the mixture, until an oily material containing an antimony compound is formed, adding water to the oily material containing said antimony compound, thereby forming a water-insoluble, colloid-like dispersion of an antimony compound in the oily material, and adding a neutralizing agent to the dispersion in order to neutralize any free acid.

2. The method of claim 1 in which the product after adding the neutralizing agent is washed with water to remove water-insoluble impurities.

3. The method of claim 1 in which substantially equal amounts of anhydrous antimony chloride and turpentine are mixed together.

4. A corrosion-resistant paint comprising the product resulting from the method of claim 1.

5. A corrosion-resistant paint comprising the product resulting from the method of claim 2.

ARTHUR ARENT.

References Cited in the file of this patent

UNITED STATES PATENTS

| Number | Name | Date |
|---|---|---|
| 1,691,069 | Humphrey | Nov. 13, 1928 |
| 2,391,293 | Carmody | Dec. 18, 1945 |
| 2,411,483 | Wachter | Nov. 19, 1946 |
| 2,580,025 | Holmes | Dec. 25, 1951 |

OTHER REFERENCES

Roberts et al.—"A Study of the Polymerization of a- and b-Pinene with Friedel-Crafts Type Catalysts." Jour. Amer. Soc. vol. 72 pp. 1226–1230 (Mar. 1950).